March 31, 1953 PALLE-FINN BEER 2,633,504

COMBINED RECORD-ERASE HEAD FOR MAGNETIC RECORDERS

Filed Feb. 3, 1949

Palle-Finn Beer INVENTOR.

BY his ATTORNEY

Patented Mar. 31, 1953 2,633,504

UNITED STATES PATENT OFFICE 2,633,504

COMBINED RECORD-ERASE HEAD FOR MAGNETIC RECORDERS

Palle-Finn Beer, Lidingo, Sweden, assignor to Svenska Aktiebolaget Gasaccumulator, Lidingo, Sweden, a corporation of Sweden Application February 3, 1949, Serial No. 74,389
In Sweden January 8, 1948

2 Claims. (Cl. 179—100.2)

Figure 1:
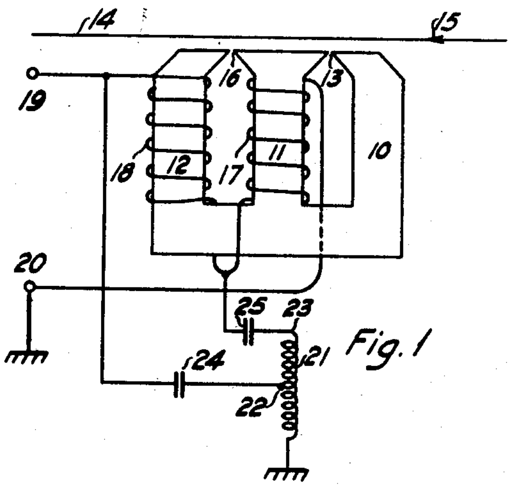

The present invention relates to magnetic recording and reproducing heads for use with elongated magnetizable members such as wires, bands, paperbands with a steel-powder-layer or the like to be used for providing a magnetic recording of sound on moving material.

In such devices it is usual to construct the magnetic head in such a way that it can provide three different operations viz. the recording of the sound, the reproduction of the sound and the demagnetizing of the sound carrier. Preferably, the removal of the sound from the band takes place by demagnetizing and introducing a new recording at a time immediately following and during the same movement of the band. For this purpose, the band passes a first airgap for demagnetizing and a second airgap for recording. For the reproduction of the sound during a separate operation the same airgap is used as when recording the sound.

In magnetic transducers of this kind, it has been proposed in order to save weight, material and volume, to use an iron core provided with three legs, the first mentioned airgap being formed between the outer leg and the middle leg, and the second airgap being formed between the other one of the outer legs and the middle leg. Another advantage with this arrangement is that, when using alternating current of high frequency for the demagnetizing, as is usually the case, the same high frequency field may easily be branched off also to form the basic magnetizing field for the magnetic recording. As a matter of fact, it is necessary for avoiding distortion due to hysteresis to superimpose an alternating magnetizing current on the sound current, and in order that this superimposed magnetizing current shall not be audible it is given a frequency essentially above the range of audibility.

This arrangement has, however, not proved satisfactory because the recording sound head and the reproduction sound head, containing the said airgaps, are usually for practical reasons built together with the amplifier, microphone, loudspeaker, motor for driving the band, transformer for the line voltage, and so on, into one single unit. These parts, especially the motor and the transformer, cause stray magnetic fields which can not, even with the best magnetic screening, be prevented from entering the iron core of the sound head. They may cause a transfer of noise during the recording, but this noise is usually of insignificant magnitude; but during reproduction the stray field causes a field through the pick-up winding which may cause a strong line noise or motor noise in the loud speaker or other reproducing means.

In order to avoid this disadvantage it has hitherto been necessary to separate the recording- and the reproduction air-gaps from the demagnetizing airgap, so that these were formed by different iron cores which were, preferably, arranged in different units, and of which the reproduction and the recording cores were provided with balanced windings. Sometimes, three units were used, viz, a separate unit for the recording and a separate unit for the reproduction.

The present invention has for an object to avoid this disadvantage.

Figure 2:
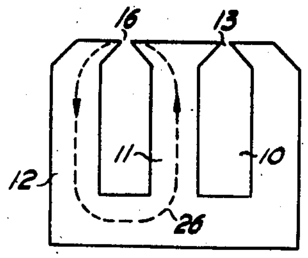
Figure 3:
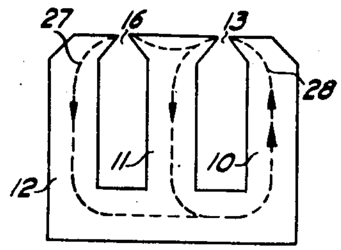

According to the invention, in a magnetic transducer with a three-leg sound head, containing demagnetizing airgap and recording-reproduction airgaps, the reproducer winding is arranged in balanced relation on the two legs which form the reproduction airgap. Further details of the invention will be evident from the following description of one embodiment of the invention in connection with the attached drawing, in which Fig. 1 is a general wiring diagram for the arrangement of the iron core with its winding. Fig. 2 shows the magnetic circuit for the recording current, and Fig. 3 shows the magnetic circuit for the demagnetizing current.

In the arrangement according to Fig. 1, the three legs of the iron core are indicated 10, 11 and 12. Between the legs 10 and 11 the first airgap 13 is formed, which is used for demagnetizing the band 14. It is assumed that during the recording as well as during the reproduction, this band moves in the direction of the arrow 15. Between the legs 11 and 12 the second airgap 16 is formed, which serves partly for recording and partly also for reproduction. The legs 11 and 12 are provided each with one winding 17 and 18, respectively, of similar character, and these two are connected in series and in magnetic cooperation to the terminals 19 and 20, respectively, for the sound current.

If a homogeneous field hits the iron core, substantially the same field will pass through both of the legs 11 and 12. At the reproduction, these fields will, therefore, cause voltages in the windings 17 and 18, which are of opposite directions, and consequently, substantially neutralize or balance each other. The field provided across the airgap 16 for magnetizing the band, however, causes an alternating field through the cores 11 and 12, which passes in such a direction that the voltages created in the winding 17 and 18 cooperate.

The demagnetizing takes place with alternating current in a way known per se, preferably with a frequency which is substantially higher than the highest audible frequency, for instance in the magnitude of 30 to 50 kc./s. The movement of the band past the airgap 13 is slow compared with this high frequency, so that a very great number of hysteresis loops are formed during the time when each particle of the band is under the influence from the field of the airgap, and the more the particle recedes from the middle of the airgap the weaker the magnetic field through this particle will be, finally ceasing totally. The band then is regarded as demagnetized. The band will never be fully demagnetized, but the remaining magnetic force is so weak that it does not disturb a new recording.

In order to create a field of high alternating frequency, windings 17 and 18 are connected to the winding 21 carrying high frequency current in a way which is evident from Fig. 1. The winding 21 is provided with a suitable tap 22, so that an essentially weaker voltage is obtained between the high voltage terminal 23 and the tap 22 than over all of the winding 21. The upper winding part is connected to winding 18 over two coupling condensers 24 and 25 of such a small capacity, that no observable shunting of the sound frequency current or voltage between the terminals 19 and 20, respectively, is caused. Winding 17 is fed across condenser 25 and ground with all of the voltage across the coil 21, a very strong field thus being created.

The fields in the legs 11 and 12 thus cooperate as regards the sound frequency field, but they counteract as regards the high frequency field. By the balanced arrangement of the windings 17 and 18 the sound frequency field will, therefore, close substantially as shown by the dotted line 26 in Fig. 2. On the other hand, the high frequency field closes as is evident from the dotted lines 27 and 28 in Fig. 3. It is then evident that a component, created by the field through the legs 10 and 11, is essentially stronger than the component passing through the legs 10 and 12, due to the branching off of a part voltage by means of the tap on the coil 12. This is also necessary for a correct dimensioning of the fields, required as demagnetizing field and as basic magnetizing for the recording, respectively, because the field through airgap 13 is thus formed by the sum of the two component fields, whereas the field through airgap 16 consists of the difference between these fields.

By arranging the windings in the above mentioned manner, a complete compensation and balance between the fields is obtained, thereby avoiding the damaging influence of stray fields impressed from the outside.

What is claimed is:

1. A magnetic transducer for use with a moving band of magnetic material, comprising a core of magnetic material having a bottom member and three spaced legs extending upwardly therefrom to form air gaps at their free ends between the center leg and each outer leg respectively over which said band is adapted to pass in sequence, and windings on said center leg and on one only of said outer legs, sound current leads, and means connecting said windings to said leads in series aiding relationship with respect to the flux produced thereby across the air gap between the legs carrying said windings, whereby the sound current flux is confined to a circuit including said two legs and said air gap, a source of high frequency demagnetizing current, and means connecting said source to said windings in a sense to superimpose said demagnetizing current on the sound current in said windings in a direction to cause the high frequency flux to pass in the same direction through both of said winding carrying legs and in the opposite direction through the non-winding carrying leg, whereby the gap between the last leg and the center leg carries the demagnetizing flux.

2. A magnetic transducer as set forth in claim 1 in which said source is connected to supply a high frequency voltage to the winding on the center leg which is higher than the high frequency voltage supplied to the other winding, whereby the demagnetizing flux across the gap between the winding carrying legs is smaller than the demagnetizing flux across the other gap.

PALLE-FINN BEER.

REFERENCES CITED

The following references are of record in the file of this patent:

UNITED STATES PATENTS

| Number | Name | Date |
|---|---|---|
| 2,456,767 | Camras | Dec. 21, 1948 |
| 2,475,421 | Camras | July 5, 1949 |
| 2,483,123 | Clapp | Sept. 27, 1949 |
| 2,536,810 | Holms | Jan. 21, 1951 |